United States Patent [19]

Kenneally

[11] Patent Number: 4,738,859
[45] Date of Patent: Apr. 19, 1988

[54] PROCESS FOR PREPARING COOKIE DOUGH PIECES

[75] Inventor: Corey J. Kenneally, Maineville, Ohio

[73] Assignee: The Procter & Gamble Company, Cincinnati, Ohio

[21] Appl. No.: 58,428

[22] Filed: Jun. 5, 1987

[51] Int. Cl.$^4$ ............................................. A21D 13/00
[52] U.S. Cl. ................................ 426/275; 426/283; 426/94; 426/289
[58] Field of Search ............... 426/275, 279, 283, 289, 426/94

[56] References Cited

U.S. PATENT DOCUMENTS 2,998,318  8/1961  Forkner .............................. 426/275
4,563,358  1/1986  Mercer et al. ...................... 426/284

FOREIGN PATENT DOCUMENTS 2318074  10/1974  Fed. Rep. of Germany.
151247  11/1976  Netherlands.

Primary Examiner—Joseph Golian
Assistant Examiner—Mary S. Mims
Attorney, Agent, or Firm—Richard C. Witte; Ronald L. Hemingway

[57] ABSTRACT

A process for preparing cookies with prominent display of edible bits, comprising forming a dough rope, creating a channel on its top surface, placing bits in the channel, covering the bits with a partial layer of additional dough in the form of randomly placed strings or strips, cutting the rope into individual cookie shapes, and baking.

14 Claims, No Drawings

PROCESS FOR PREPARING COOKIE DOUGH PIECES

BACKGROUND OF THE INVENTION

Taste and texture are two important cookie characteristics. A third equally important characteristic, is appearance. In traditional cookie processes, whether home-baked or commercially produced, bits of chocolate chips, raisins, nuts, peanut butter, and the like are added either as the dough is mixed or incorporated into the dough prior to shaping it into a sheet, rope, or individual dough balls or pieces. In typical home-baked cookies, the bits are mixed in with the other ingredients when preparing the dough. The dough is then formed into individual pieces. In many commercial processes, the bits are added to the dough after it is mixed, but before shaping the dough into a sheet, rope, or individual pieces.

Whether the bits are added during dough mixing or after mixing but prior to shaping the dough into a sheet, rope, or individual pieces for baking, the bits in the final baked product are substantially covered by dough. This makes the product appear to have fewer bits. Additionally, many of the dough processing, mixing, and rope formation steps tend to destroy the distinct shape, taste, texture, color, and identity of the added bits. Consequently, cookies tend to have a low level of bit display, and the bits tend to lose their distinct characteristics.

In a process where bits are added subsequent to sheet, rope, or individual piece formation, many problems can arise. First, securing the bits to the dough is difficult. Putting the bits on top of a cookie dough piece prior to and upon baking results in low bit adhesion, which in turn results in dislodgement of bits in baking, cooling, packaging, shipping, and handling. The appearance of the final product suffers. Second, there can be a high amount of waste when bits are added after dough formation. To adequately cover the cookie surface, excess bits must be used. This necessitates an additional bit reclamation and recycle step. As is evident, prominent display of bits is as difficult as adequately securing the bits to the cookie surface. All of these problems directly impact on final cookie appearance or processing costs, and ultimately on consumer preference.

In U.S. Pat. No. 2,998,318 to Forkner (1961), a method for adding filler materials to cookies is disclosed. Forkner describes a method whereby a flat dough sheet is formed, bits are sprinkled on top, a second thin sheet is, or side by side strips of dough are placed over the bits, and the combination is then pressed to form a laminate with prominently displayed, securely fastened, added bits.

Several problems can arise when using this process. First, bits sprinkled on the bottom dough sheet do not remain on the sheet, thus necessitating a reclamation and recycle step to minimize waste. Second, the use of a top sheet of dough covers the bits, and they lose their prominent display in the final cookie. The use of side by side strips of top dough results in a baked cookie with "stripes" on its top surface which can detract from its appearance. Lastly, pressing the bits into the dough can result in a cookie with little or no surface contours, thus detracting from its appearance and from consumer appeal.

It is therefore an object of the present invention to provide a process for preparing cookie dough in which the bits are prominently displayed.

It is also an object of the present invention to provide a process for preparing cookie dough in which the bits are secured to the cookie structure while remaining prominently displayed.

It is another object of this invention to greatly reduce or eliminate the amount of waste incurred when adding bits to cookie dough.

It is still another object of this invention to produce a cookie that has a home-made appearance.

These and other objects will become obvious from the disclosures herein.

SUMMARY OF THE INVENTION

A process is disclosed which comprises forming individual pieces or a continuous rope of cookie dough, creating a channel on the top surface of the dough, depositing bits into the channel, and partially covering the bits with one or more continuous thin strings or strips of dough deposited in a random manner. In a preferred embodiment, a second addition of bits subsequent to the deposition of the random strings or strips occurs.

DETAILED DESCRIPTION OF THE INVENTION

The present invention discloses a process for making cookies whereby added food bits, chunks and particles are securely fastened to the cookie while at the same time are prominently displayed in the final baked product. This dual achievement is accomplished through an unique multi-step process of preparing cookie dough pieces for baking.

Prerequisite to the procedure is combination of the necessary ingredients which will comprise the base cookie dough. Virtually any cookie dough which contains edible bits can benefit from the process of the present invention. This includes single-texture crisp, chewy or soft cookies, and dual-textured crisp/chewy cookies. Such dual-textured cookies are preferred for use in this process, and have dough compositions similar to cookies of U.S. Pat. No. 4,455,333 (Hong and Brabbs, 1984) and U.S. Pat. No. 4,503,080 (Brabbs and Hong, 1985), whose teachings are hereby incorporated by reference.

Briefly, cookies of the U.S. Pat. Nos. 4,455,333 and 4,503,080 are cookies which exhibit discrete regions of crisp and chewy texture. Typically, cookies of these patents result from the coextrusion of two distinct doughs into a single laminated dough structure. One of the doughs contains sugars which are readily crystallizable: the other dough contains crystallization-resistant sugars U.S. Pat. No. 4,455,333 or sugars in which crystallization has been inhibited U.S. Pat. No. 4,503,080. The first dough containing the readily crystallizable sugar comprises the crisp region of the baked cookie and is generally the outer dough region. The second dough comprises the chewy region of the baked cookie, and is generally substantially enrobed or enveloped by the first dough. The ratio of inner dough to outer dough can vary greatly.

One execution of the U.S. Pat. No. 4,455,333 describes preparing a first cookie dough from typical cookie ingredients which will act as the chewy dough. This dough also contains a crystallization-resistant sugar. Similarly, a second cookie dough is also prepared using a readily crystallizable sugar. One, both, or either dough can further comprise a member selected from the group consisting of cereals, nutmeats, peanut butter, cocoa, raisins, chocolate chips, butterscotch chips, and mixtures thereof. It has now been found that in addition to the above list, fruit pieces, candies and confections such as M&M's ®, Reese's Pieces ®, and Rolos ®, and chocolate or fudge chunks are also suitable ingredients. The two doughs are then combined in such a manner that the first dough is substantially enveloped by a layer of the second dough to form a laminated dough structure.

Similarly, the U.S. Pat. No. 4,503,080 describes a procedure comparable to the U.S. Pat. No. 4,455,333 in which the difference lies in the use of a crystallization inhibitor in the first dough.

By "readily crystallizable sugar" is meant a mono- or disaccharide, or mixture of mono- and/or disaccharides, that readily and spontaneously crystallizes at the water content and water activity conditions encountered in semi-moist cookies of the home-baked type. Sucrose is virtually unique among the readily available food sugars in this regard, crystallizing spontaneously at $a_w$ levels from about 0.25 to 0.8 in normal cookie systems. Mixtures of readily crystallizable sugars with other mono- and/or disaccharides, where readily crystallizable sugars comprise over 85% of the total sugar, exhibit crystallization behavior similar to a pure readily crystallizable sugar.

By "crystallization-resistant sugar" is meant a mono- or disaccharide, or mixture of mono- and/or disaccharides, which crystallizes, at the water content and water activity encountered in the semimoist cookies of the home-baked type, substantially more slowly than sucrose under the same conditions, typically remaining uncrystallized for periods of at least 1–6 months. Particularly good crystallization resistant sugars are fructose, dextrose, and mixtures of sugars of which fructose and dextrose together comprise at least about 15% by weight, and solutions thereof. Other common sugars include sorbose, mannose, galactose, maltose, and lactose.

"Monosaccharides" and "disaccharides" as used herein are compounds well known to the art.

By "sugar crystallization inhibitor" is meant a compound or composition which inhibits sucrose or other readily-crystallizable sugar crystallization in the baked cookie, so that the sugar crystallizes, at the water content and water activity encountered in semi-moist cookies of the home-baked type, substantially more slowly than the same sugar would under the same conditions in the absence of the inhibitor, preferably remaining uncrystallized for periods of at least 1–6 months. Particularly good sugar crystallization inhibitors include food-compatible polyols, such as sugar alcohols, sugar esters, sugar polymers, glycols, polyglycerols, polyglycerol esters, and starch hydrolysates. The sugar alcohols comprise a well known group of compounds, including sorbitol, mannitol, maltol and xylitol. Sugar esters comprising the disaccharide monoesters of the $C_{12}$–$C_{22}$ fatty acids, such as sucrose mono-oleate, can be employed. The sugar polymers including dextrins and cellulose are also useful. Other possible crystallization inhibitors include glycerol, polyglycerols, and polyglycerol esters having an average of two to ten glycerol units per polyglycerol moiety. The esters are preferably prepared with saturated fatty acids containing 14 to 22 carbon atoms. In any event, the crystallization inhibition capability and effective level of any material can be readily determined without undue experimentation by storage of mixtures of the material with the desired readily crystallizable sugar, either in standard solutions or in the intended cookie dough or crumb system. Crystallization can then be determined either by direct observation of crystal formation or by common X-ray diffraction techniques.

As applied to the present invention, either laminated dough structure is suitable, as well as many other cookie doughs. For example, the cookie dough could be a single dough for making a crisp cookie, i.e. generally containing sucrose as the sugar component; the cookie dough could be a single dough for making a chewy cookie, i.e. generally containing high fructose corn syrups, invert syrups, or honey alone or mixed with sucrose wherein sucrose comprises less than 75% of the mixture; or, the cookies to be made could be dual- or multi-dough cookies made from two crisp doughs, or two chewy doughs, or different formulations of either dough. Preferably, this invention is used to make crisp and chewy cookies from two doughs. For purposes of this invention, a multitude of doughs are suitable and some bits can be added during the dough preparation stages.

In general, cookie doughs are hydrated mixtures of sugar, flour, shortening, leavening, and flavorants. The type and amount of each ingredient will vary depending on the type of cookie to be produced.

Any typical shortening can be used.

Other additives, for example, peanut butter, oatmeal, emulsifiers, can be used. Any conventional cookie dough can be used in the process of the present invention.

Having mixed the base cookie dough, it is now necessary to form the continuous sheet, continuous rope, or individual pieces of dough which will be used in the later process steps. The concept underlying the process of the present invention is equally applicable to sheets, ropes, or individual pieces. It can be appreciated by those skilled in the art that the order of the steps and the benefits derived from those steps remain the same whether using a continuous dough sheet, a continuous dough rope, or individual dough pieces. Changes that are necessary occur due to the unique shape of each dough structure utilized. While the disclosure below is a detailed description of the process with respect to dough ropes, the process is not limited to dough ropes. A dough rope is a piece of dough formed into a continuous mass like a rope or worm. Generally, the dough rope is not twisted or braided, but it can be.

Any commercial means of continuous rope formation is suitable. For single-dough structures, extrusion through a tube of suitable diameter or formation by any suitable means into a dough rope is acceptable. For laminated dual- and multi-dough structures, the formation of the rope is particularly well-suited, though not limited, to co-extrusion of the doughs into a single, continuous rope. The manner in which the rope is created is not critical.

Suitable dough extruders can be obtained from Bepex-Hutt of Germany and Werner-Lehara of Michigan. Care should be taken in choosing an extruder that will not overwork the dough during the extrusion process.

The size and shape of the dough rope are two factors which control the final cookie size. The size of dough pieces cut from the rope is another factor.

To produce baked cookies of from about 50 mm to about 105 mm in diameter, the dough rope should have a width of from about 30 mm to about 40 mm and a height or thickness of from about 15 mm to about 30 mm, the cross-sectional shape being generally rectangular or square. The rope can also be of circular cross-sectional shape (cylindrical) with a radius of from about 10 mm to about 20 mm.

Whether shaped by hand, by extrusion, or by other means, the dough rope is preferably placed onto a conveying system. The speed or rate at which the rope travels is generally a factor of the capacity of the oven. In turn, this rate affects the entire process of this invention. However, the absolute rate of the dough rope is not critical. It is easily seen by one skilled in the art that most dough rope speeds are possible. Higher dough rope speeds will necessitate correspondingly higher bit addition and partial dough layer addition rates.

The dough rope speed or rate can be defined in several ways. For example, if a dough rope is extruded in an amount of from about 500 g/minute to about 800 g/minute, having a substantially rectangular cross-sectional shape of width of about 35 mm and thickness of about 25 mm, the linear speed of the rope will range from about 625 mm/minute to about 1000 mm/minute. For a dough rope rate of about 700 g/minute, having the cross-sectional shape just described, the rope speed will be about 875 mm/minute. Initial determination of the dough rope speed is essential to determining the rate at which the random partial layer of dough is added, and thus producing a baked product which meets the appearance criteria of this invention. The linear speed of the dough rope is hereinafter referred to as "dough rope speed".

Another method of describing dough rope rate speed or rate is to determine the amount of dough per unit length of rope. For a dough rope having a substantially rectangular cross-sectional shape of width of about 35 mm and thickness of about 25 mm, depending on the type and amount of bits initially in the dough, the rope should comprise from about 0.6 g/mm to about 1.1 g/mm, preferably about 0.9 g/mm. For a dough rope having a substantially circular cross-sectional shape of diameter about 25 mm, the rope should comprise from about 0.3 g/mm to about 0.6 g/mm, preferably about 0.5 g/mm.

Upon producing the rope, the next step of the present invention comprises forming a channel onto the top surface of the dough rope. The channel serves as a trough or cup to hold the added bits near the top surface of the cookie. The channel can be in the cross-sectional shape of a rectangular, V-shaped, W-shaped, or semi-circular depression. The channel is created by passing the dough rope under a roller having the desired shape, mounted at a height above the rope sufficient to create the correct depression and dough displacement. In the alternative, the channel can be created as the rope is extruded using an exit nozzle shaped such that a depression is left on the top surface of the extruded dough rope. Either method is equally preferred. A cutting bar can also be used.

Because desired finished cookie sizes vary, generally the channel should be from about 25% to about 90% of the width, and from about 5% to about 40% of the height of the dough rope as measured immediately after forming the channel. Preferably, the channel should be from about 50% to about 85% of the width, and from about 8% to about 25% of the height of the dough rope as measured immediately after forming the channel. The channel should preferably be centered along the axis of travel of the dough rope so that upon creating the depression, approximately equal amounts of dough are displaced to both sides of the channel. The channel can be continuous, that is, it runs the entire length of the rope; or it can be created in discrete regions of the rope, for example, periodic depressions created as "cup-like" pockets. To substantially eliminate the need to reclaim and recycle spilled or loose bits, it is preferred that the channel be continuous when using a dough rope.

A rectangular dough rope 35 mm wide and 25 mm high will preferably have a channel from about 18 mm to about 30 mm wide and from about 2 mm to about 10 mm deep. These general dimensions are preferred for a channel with rectangular, V-shaped, W-shaped, or semi-circular cross-sectional shape.

After creating the channel, the next step is to partially fill the channel with edible filler bits. Any means of deposition is suitable. Suitable bits comprise cereals, nutmeats, peanut butter, cocoa, raisins, chocolate chips, butterscotch chips, chocolate or fudge chunks, fruit pieces, candies and confectioneries such as M&M's®, Reese's Pieces®, and Rolos®, jams and jellies, and mixtures thereof. Chocolate can be semi-sweet, dark, milk or white.

The rate of bit addition can be expressed two ways. Generally, the bits should be added at a rate such that they comprise from about 1.0% to about 15% by weight, preferably from about 3.0% to about 10.0% by weight of the dough rope/bit perform. Because different bits have different masses, the rate of bit addition should generally be such that from about 10% to about 90% of the top surface of the dough rope is covered. Preferably, from about 50% to about 90% of the top surface is covered. For a rope speed of about 860 mm/min (680 g/min) with a channel of about 30 mm wide and about 5 mm deep, a preferred rate of adding bits is from about 10 g/min to about 90 g/min in such a manner that the bits are deposited substantially uniformly down the length of the rope; preferably, from about 20 g/min to about 70 g/min. For a dough rope of about 0.9 g/mm, the bits should be added at a rate such that they comprise from about 0.04 g/mm to about 0.08 g/mm. The amounts used depends on the size and shape of the bits selected and the appearance and taste desired in the final product.

After depositing the bits in the channel, one or more continuous strings or strips of dough are randomly deposited to the top surface of the dough rope bit conglomeration. The size of the strings or strips is critical, as is the rate of their deposition and the distance from which they are deposited. These strings or strips act to create a partial layer of dough which performs two major functions. First, the partial dough layer helps secure the filler bits to the dough rope. Second, the partial dough layer prominently displays the filler bits. An additional benefit is that random orientation of the strings or strips causes the strings or strips to be less noticeable upon baking. Side by side strips tend to bake out into visible stripes on the cookie surface. Random strings or strips blend in to the base cake upon baking. Cookies of the present invention have a close to homemade appearance as a result of the partially visible bits.

When using a dough rope made of a single dough, the composition of the randomly applied strings or strips should be similar to that of the dough rope. This insures that the partial dough layer does not bake out into a different color or at a different rate than the rest of the cookie. When using a dough rope which is made from two different doughs, such as those described by the U.S. or Pat. Nos. 4,455,033 care should be taken to select string or strip composition similar to the outer or predominantly outer dough. Preferably, viscosity of the strings or strips should be substantially the same as the viscosity of the dough rope; however, the viscosity can be somewhat lower without adversely affecting cookie quality. For example, a partial dough layer with lower viscosity than the dough rope would tend to blend into the dough rope more readily. Apparent viscosity should be from about 500 to about 50,000 poise, at 24° C. (75° F.).

Various methods are suitable for achieving the random orientation of the continuous strings or strips of the partial dough layer. One method is to vibrate or more the depositing apparatus while the strings or strips are being deposited. Typically, the depositing apparatus consists of an extruder with exit nozzles on the bottom surface in the shape of the string or strip to be produced. Vibrating or moving the extruder and/or the nozzles causes the strings or strips to arrange themselves in a haphazard or random orientation on the dough rope.

A second, and preferred, mechanism is simply to extrude the strings or strips from a fixed apparatus at a distance above the top surface of the dough rope of from about 10 mm to about 100 mm at a linear rate of from about 1.5 to about 4.5 times the dough rope speed. Preferably, the distance is from about 15 mm to about 75 mm and the rate is from about 1.5 times to about 3.0 times the dough rope speed. This causes the strings or strips to bend, twist, and wind, rather than deposit in straight lines. While not limited to theory, it is believed that this random deposition is caused by having faster string or strip rate from close distance which prevents the strings or strips from depositing in a straight line by causing a certain amount of "black pressure" to develop, resulting in the strings bending, twisting, and winding rather than depositing in straight lines. As used herein, "back pressure" means a greater amount of resistance against the direction of string or strip flow than would occur had the extrusion not occurred at close range to the dough rope and had the rate of deposition been the same as or less than the rope speed. It is the combination of faster string or strip speed and close distance which causes the random distribution.

String or strip size should be sufficiently large to secure the filler bits to the dough rope, yet not so large as to obscure their prominent display. It has been found that strings having a generally circular cross-sectional shape of from about 2 mm to about 10 mm diameter, preferably from about 3 mm to about 5 mm diameter, or strips having a generally rectangular cross-sectional shape of width from about 5 mm to about 20 mm and thickness of from about 1 mm to about 10 mm, preferably of width from about 9 mm to about 15 mm, and thickness from about 3 mm to about 5 mm, are suitable for most filler bits. The strings or strips should be deposited in such a manner to be capable of creating a partial dough layer over any given section of the dough rope as it is conveyed beneath the string depositing apparatus. For a dough rope of about 0.9 g/mm, the strings or strips should be added at a rate such that they comprise from about 0.04 g/mm to about 0.08 g/mm. This can be accomplished by using one or more exit nozzles spaced apart, each capable of randomly covering a specific portion of the top surface of the dough rope.

After depositing the strings or strips onto the dough rope, an optional, and preferred, step is to again deposit a quantity of bits into some of the remaining areas of the channel and onto the partial dough layer. The bits that can be used, and the rates of their application, are the same as those in the first deposition of bits described above. The amount deposited can be changed to cover as little as 0% and as much as about 90% of the top surface of the rope depending on the degree of prominent display desired, and the exact bits used can be varied. For example, in the first deposition of bits, only chocolate chips may be desired; in the second, walnut meats. The order of deposition causes the second component to be more prominently displayed than the first, while at the same time, both components are more prominently displayed than components which were mixed into the dough prior to extrusion as the dough rope. This gives the process great flexibility by allowing custom design of the final product's appearance and content.

As can easily be seen by one skilled in the art, the steps of applying bits and random strings or strips can be repeated. In this way, a multitude of textures and appearances are possible. After all the bits and layers are added, a tamping step is optionally but preferably performed which serves to place the dough rope into acceptable condition for cutting. The tamping is accomplished by conveying the rope under a roller located at a height above the conveying system such that the bits and partial layer are lightly pressed into place. As the rope passes under the roller, the various bits and random strings or strips are lightly pressed into their final configuration. At the same time, any remaining channel depressions have a tendency to partially smooth out from the pressure leaving some surface contours. It has been found that a "penetration distance" of from about 1 mm to about 5 mm, preferably from about 1 mm to about 3 mm, is suitable. "Penetration distance", as used herein, is described as the difference, at its thickest point, of the dough rope as measured immediately prior to and immediately after the tamping step. For example, a dough rope thickness of 25 mm (at its thickest point) prior to tamping, and a penetration distance of 2 mm, would result in a dough rope thickness of 23 mm (at its thickest point) immediately after tamping. The penetration distance is chosen so as to partially smooth out the surface, lightly press the bits and partial layer, yet not produce a smooth, artificial, machine-made top surface appearance.

Alternatively, the tamping can be performed as a part of the cutting step.

Cutting the dough rope can be accomplished by any conventional means. The means selected is left to the discretion of and depends on the individual.

As stated earlier, the process of the present invention is equally applicable to dough ropes, dough sheets, and individual dough pieces, with minor modifications in process equipment which are readily apparent. For example, it is apparent that different formation equipment is necessary depending on the dough piece to be used. Individual pieces will generally be formed by known wire-cut or roller former techniques. Continuous sheets can be formed much the same way as dough ropes with modification in size and shape only.

Because of the various starting shapes, several of the process parameters can also be changed to be more suitable to the starting dough shape. For instance, if a continuous sheet is used as the starting dough preform, several channels can be created in parallel configuration. Thus, the process simulates several dough rope processes operating side by side. Likewise, if using individual dough pieces, it may become more efficient to form "cup-like" depressions as channels rather than one continuous channel. However, no matter what starting dough preform is originally chosen, the process of the present invention is suitable with modifications which are readily apparent. Furthermore, as can readily be seen from the disclosure above, several different process modifications are possible and are intended to be within the scope and spirit of the disclosure.

An example follows below to demonstrate the various aspects of the present invention.

EXAMPLE 1

Dual Dough Cookie with Chocolate Chips and Nuts

| Ingredient | Percent (by weight) |
|---|---|
| Inner Dough Composition | |
| High fructose corn syrup | 22.10% |
| Flour | 21.41 |
| Shortening and emulsifiers | 13.74 |
| Sugar (sucrose) | 9.00 |
| Starch | 2.50 |
| Water | 1.15 |
| Salt | 0.50 |
| Soda | 0.40 |
| Egg white solids | 0.20 |
| Chocolate chunks | 29.00 |
| | 100.00 |
| Outer Dough Composition | |
| Sugar (sucrose) | 35.20% |
| Flour | 31.55 |
| Shortenings & emulsifiers | 19.40 |
| Water | 9.50 |
| Molasses | 1.50 |
| Starch | 1.30 |
| Salt | 0.70 |
| Soda | 0.50 |
| Egg white solids | 0.25 |
| Egg yolk solids | 0.10 |
| | 100.00 |

Procedure

The inner, chewy dough is prepared by mixing water and liquid flavoring material with high fructose corn syrup. The shortening is then added and the mixture is creamed until the shortening begins to crystallize. The sugar is then added and the mixture creamed again. All the dry ingredients are then mixed in to form a dough.

The outer, crisp dough is formed by mixing the water and liquid flavor ingredients together. The shortening is then added and this mixture creamed. Sugar is then added, and mixing continued. After that, the flour and other dry ingredients are added, and mixed until a dough is formed.

The doughs are co-extruded onto a horizontal conveyor using a Bepex-Hutt Model DDP200-3005 co-extruder into a single dough rope comprising an outer dough substantially enrobing the inner dough. The dough rope comprises approximately 25% by weight outer dough and 75% by weight inner dough. The extruder head is cut so that the initial cross-sectional shape of the dough rope is substantially rectangular with a width of about 35 mm and a thickness of about 25 mm. The rope is extruded onto a moving conveyor. A channel is formed on the top surface of the dough rope by passing the dough rope under a roller as the dough rope travels on the conveying system. The channel is a substantially rectangular shaped depression having a width of about 25 mm and a depth of about 5 mm.

Chocolate chunks are deposited from a hopper above the dough rope. Chocolate chunks are deposited into the channel at a rate such that about 6% by weight of the rope is attributable to the chunks. The chunks cover about 70% of the top surface area of the rope.

A partial layer of outer dough is extruded in the form of two strips, each having a cross-sectional shape which is substantially rectangular, each having a width of about 10 mm and a thickness of about 4 mm. The strips are extruded at a height above the dough rope of about 50 mm and at a linear speed of about 2.0 times the dough rope speed. These two strips deposit onto the top surface in a random pattern. Nutmeats are sprinkled from a hopper above the dough rope onto the dough rope at a rate such that about 5.0% by weight of the dough rope is attributable to the nuts. The nuts cover about 50% of the top surface area of the rope. The dough rope is then passed under a hard roller. The dough rope, at its thickest point, is about 3 mm less thick after passing under the roller than prior to passing under the roller. The dough rope is cut into a suitable size for individual cookies of about 38 gm each using a pinch cutter system. These dough pieces are baked at 375° F. for 8–10 minutes. The final product has prominently displayed chips and nut pieces which are securely fastened on its top surface.

What is claimed is:

1. A process for preparing cookie dough pieces comprising:
    (a) forming a continuous dough rope having a channel on its top surface, said channel being from about 25% to about 90% of the width and from about 5% to about 40% of the height of the rope, said channel running along the axis of travel of said dough rope so that approximately equal amounts of dough are present on either side of the channel;
    (b) placing said dough rope on a horizontal conveying system;
    (c) depositing into said channel edible bits at a rate such that from about 10% to about 90% of the top surface of said dough rope is covered;
    (d) depositing continuous, randomly placed strings or strips of dough on the surface of said dough rope, said strings having a diameter of from about 2 mm to about 10 mm, said strips being from about 5 mm to about 20 mm wide and from about 1 mm to about 10 mm thick, said dough deposited at a linear rate of from about 1.5 to about 4.5 times the linear rate of said dough rope and at an exit nozzle distance of from about 10 mm to about 100 mm from the top surface of said dough rope; and
    (e) cutting said dough rope into individual pieces.

2. The process of claim 1 further comprising a second deposition of edible bits, said deposition occurring subsequent to the deposition of the continuous, randomly placed strings or strips of dough, the rate of said second deposition being sufficient to cover from 5% to about 90% of the top surface of said dough rope.

3. The process of claim 1 further comprising lightly tamping the top surface of said dough rope prior to cutting into individual pieces, said tamping accomplished by passing said dough rope under a roller in a manner which presses said top surface of said dough rope without eliminating the surface contours.

4. The process of claim 1 wherein the bits comprise chocolate chips, chocolate chunks, nutmeats, fruit pieces, raisins, cereals, cocoa, butterscotch chips, peanut butter, candies and confectioneries, and mixtures thereof.

5. The process of claim 2 wherein the bits of the second deposition comprise chocolate chips, chocolate chunks, nutmeats, fruit pieces, raisins, cereals, cocoa, butterscotch chips, peanut butter, candies and confectioneries, and mixtures thereof.

6. The process of claim 1 wherein the bits are deposited at a rate such that from about 50% to about 90% of the top surface of said dough rope is covered.

7. The process of claim 2 wherein the bits of the second deposition are deposited at a rate such that they cover from about 50% to about 90% of the top surface of said dough rope.

8. The process of claim 1 wherein the dough deposited in step (d) is deposited to the top of said dough rope at a linear rate of from about 1.5 to about 3.0 times said dough rope speed.

9. The process of claim 8 wherein the dough deposited in step (d) is deposited in the form of narrow strings of substantially circular cross-sectional shape with a diameter of from about 3 mm to about 5 mm.

10. The process of claim 8 wherein the dough deposited in step (d) is deposited in the form of narrow strips of substantially rectangular cross-sectional shape with width of from about 9 mm to about 15 mm and thickness of from about 3 mm to about 5 mm.

11. The process of claim 9 wherein said dough deposited in step (d) is deposited at a distance of from about 15 mm to about 75 mm from the top surface of said dough rope.

12. The process of claim 10 wherein said dough deposited in step (d) is deposited at a distance of from about 15 mm to about 75 mm from the top surface of said dough rope.

13. The process of claim 1 wherein said dough rope comprises a dual- or multi-dough structure in which one dough substantially enrobes or envelopes the other dough or doughs.

14. The process of claim 13 wherein the dough deposited in step (d) comprises substantially the same composition as the outermost dough of said dough rope.

* * * * *

UNITED STATES PATENT AND TRADEMARK OFFICE
CERTIFICATE OF CORRECTION

PATENT NO. : 4,738,859
DATED : April 19, 1988
INVENTOR(S) : Corey J. Kenneally

It is certified that error appears in the above-identified patent and that said Letters Patent are hereby corrected as shown below:

Column 2, line 54 "able:" should read -- able; --

Column 7, line 4 "U.S. or Pat. Nos. 4,455,333" should read
  -- '333 or '080 patents --

Column 7, line 17 "more" should read -- move --

Column 7, line 38 "black" should read -- back --

Signed and Sealed this

Eleventh Day of April, 1989

Attest:

DONALD J. QUIGG

*Attesting Officer*    Commissioner of Patents and Trademarks